US012811666B2

(12) United States Patent
Carney Landow

(10) Patent No.: US 12,811,666 B2
(45) Date of Patent: Nov. 24, 2026

(54) CELLULAR NETWORK HOSTED TELECOMMUNICATIONS RELAY SERVICES METHODS AND SYSTEMS

(71) Applicant: Boost SubscriberCo L.L.C., Englewood, CO (US)

(72) Inventor: Kate Megan Carney Landow, Denver, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 229 days.

(21) Appl. No.: 18/893,041

(22) Filed: Sep. 23, 2024

(65) Prior Publication Data

US 2025/0015876 A1 Jan. 9, 2025

Related U.S. Application Data

(63) Continuation of application No. 17/698,733, filed on Mar. 18, 2022, now Pat. No. 12,126,423.

(51) Int. Cl.

| | |
|---|---|
| ***H04W 36/00*** | (2009.01) |
| ***H04B 7/155*** | (2006.01) |
| ***H04W 4/16*** | (2009.01) |
| ***H04W 48/18*** | (2009.01) |
| *H04W 88/18* | (2009.01) |

(52) U.S. Cl.
CPC .......... *H04B 7/15507* (2013.01); *H04W 4/16* (2013.01); *H04W 48/18* (2013.01); *H04W 88/18* (2013.01)

(58) Field of Classification Search
CPC . H04W 88/06; H04W 92/02; H04W 36/0011; H04W 4/16; H04W 48/08; H04W 80/00; H04W 88/08; H04W 12/08; H04W 36/0005; H04W 52/36; H04W 88/16; H04W 8/205
See application file for complete search history.

(56) References Cited

U.S. PATENT DOCUMENTS

2020/0383031 A1* 12/2020 Gu ........................ H04W 40/22

* cited by examiner

*Primary Examiner* — Gary Lafontant
(74) *Attorney, Agent, or Firm* — Kilpatrick Townsend & Stockton LLP

(57) ABSTRACT

Various arrangements for providing cellular network hosted telecommunications relay services (TRS) are detailed herein. A piece of user equipment (UE) can be reassigned from a first slice of the cellular network to a second slice of the cellular network that provides TRS. In response to a voice call being initiated and the UE being assigned to the second slice, a TRS function hosted by the cellular network can be provided for the voice call.

20 Claims, 5 Drawing Sheets

CELLULAR NETWORK HOSTED TELECOMMUNICATIONS RELAY SERVICES METHODS AND SYSTEMS

This application is a continuation of U.S. Non-Provisional patent application Ser. No. 17/698,733, filed on Mar. 18, 2022, which is incorporated by reference for all purposes.

BACKGROUND

Telecommunications relay services (TRS) can typically be accessed by a person dialing 711 from a landline phone or cellular phone. TRS can be used by a person who has a hearing or speech disability and desires to communicate with someone else, who may or may not have a disability. Further, TRS can be used by a person without a hearing or speech disability who desires to communicate with someone who does have such a disability. In some jurisdictions, such as the United States, telephone companies that operate private branch exchanges (PBXs) are required to implement access to TRS.

Conventionally, TRS involves an operator helping facilitate a 711 call. The operator can translate text to speech and speech to text as needed, allowing the person with a disability to communicate using their preferred communication method. For example, if a non-disabled person uses TRS provided via 711 to call a hearing-impaired person, the operator may convert the non-disabled person's speech into text that is presented on the hearing-impaired person's phone. The hearing-impaired person may then respond using speech or may type a response (e.g., via a teletypewriter (TTY) or real-time text (RTT) enabled device).

Embodiments detailed herein provide improvements both for the end users and telephone network operator, allowing significant flexibility in how TRS are provided and accessed by disabled and non-disabled users.

SUMMARY

In some embodiments, a method for providing cellular network hosted telecommunications relay services (TRS). The method can include receiving, by a cellular network, a user preference from a user equipment (UE). The method can include reassigning, by the cellular network, the UE from a first slice of the cellular network to a second slice of the cellular network. The second slice can provide access to a TRS function. The method can include, in response to a voice call being initiated and the UE being assigned to the second slice, initiating, by the cellular network, the TRS function hosted by the cellular network for the voice call. The method can include providing, by the cellular network, the TRS function for the voice call.

Embodiments of such a method can include one or more of the following features: The user preference for TRS is to convert text input to the UE during the voice call to speech. The user preference for TRS is to convert voice input to the UE during the voice call to text. The text that is output can be selected from the group consisting of: real time text (RTT); and teletypewriter (TTY) text. The cellular network may be a 5G New Radio (NR) network. The first slice may not provide access to the TRS function. The voice call may be initiated by the UE and initiation of the voice call can include a session initiation protocol (SIP) header being created that specifies TRS preferences based on the received user preference. A core of the cellular network can initiate the TRS based on the SIP header. The voice call may be initiated by a second UE separate from the UE and the TRS function initiated is based on the user preference.

In some embodiments, a cellular network with integrated telecommunications relay services is present. The cellular network can include a plurality of radio units (RUs). The cellular network can include a plurality of distributed units (DUs) connected with the plurality of RUs. The cellular network can include a plurality of centralized units (CUs) connected with the plurality of DUs. The cellular network can include a 5G core connected with the plurality of centralized units, wherein the 5G Core comprises a TRS function. The cellular network can be configured to receive a user preference from a user equipment (UE). The cellular network can be configured to reassign the UE from a first slice of the cellular network to a second slice of the cellular network. The second slice can provide access to the TRS function. The cellular network can be configured to, in response to a voice call being initiated and the UE being assigned to the second slice, initiate the TRS function hosted by the 5G core for the voice call. The cellular network can be configured to execute the TRS function for the voice call.

Embodiments of such a cellular network can include one or more of the following features: The user preference can be to convert text input to the UE during the voice call to speech. The TRS function can be a text-to-speech (TTS) function. The user preference can be to convert speech input to the UE during the voice call to text. The TRS function can be a speech-to-text (STT) function. The text that is output can be selected from the group consisting of: real time text (RTT); and teletypewriter (TTY) text. The first slice may not provide access to the TRS function. The cellular network can further include the UE, wherein the voice call is initiated by the UE and initiation of the voice call can include a session initiation protocol (SIP) header being created that specifies a TRS preferences based on the received user preference. The 5G core of the cellular network can initiate the TRS function based on the SIP header for the voice call. The voice call may be initiated by a second UE separate from the UE and the TRS function initiated is based on the user preference.

In some embodiments, a non-transitory processor-readable medium, comprising processor-readable instructions. The instructions can be configured to cause one or more processors to receive a telecommunication relay service (TRS) user preference from a user equipment (UE). The instructions can be configured to cause one or more processors to reassign the UE from a first slice of a 5G New Radio (NR) cellular network to a second slice of the 5G NR cellular network. The second slice may provide access to a TRS function. The instructions can be configured to cause one or more processors to, in response to a voice call being initiated and the UE being assigned to the second slice, initiate the TRS function hosted by the cellular network for the voice call. The instructions can be configured to cause one or more processors to execute the TRS function for the voice call.

Embodiments of such a non-transitory processor-readable medium can include one or more of the following features: The UE can be reassigned in response to the user preference and the voice call being initiated. The first slice may not provide access to the TRS function.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments detailed herein allow for telecommunications relay services (TRS) to be provided either by an external provider or by a service residing in the core of the cellular network. A cellular network, such as a 5G New Radio (NR) cellular network, may have a core that allows for various functions to be executed. Access to functions and quality of service (QOS) provided to user equipment (UE) can be allocated using network slicing. A UE can be assigned and reassigned among slices. Each slice may function as its own virtual cellular network that operates on the same physical infrastructure as other slices but are logically independent of each other.

A user can input one or more TRS preferences on her UE. The TRS preferences can be used to indicate: 1) whether TRS is requested; 2) the types of TRS requested; and/or 3) a service provider to provide the TRS. In some embodiments, if TRS is enabled, the user's UE can be assigned to a particular slice of the cellular network for which one or more TRS functions are executed on the cellular network, such as in the core of the cellular network. This slice can have defined operating parameters that allow for a high level of quality of experience (QoE) for TRS functions (such as compared to a standard consumer slice).

Session Initiation Protocol (SIP) Headers may be used to define aspects of the TRS that are to be provided when a telephone call is initiated. The SIP header can include TRS data that defines the user's preferences that were previously set on the user's UE. Therefore, rather than a user having to dial 711 to access the desired TRS, the user's preferences set on the UE can automatically cause the correct TRS to be activated for an outgoing or received voice call.

Figure 1:
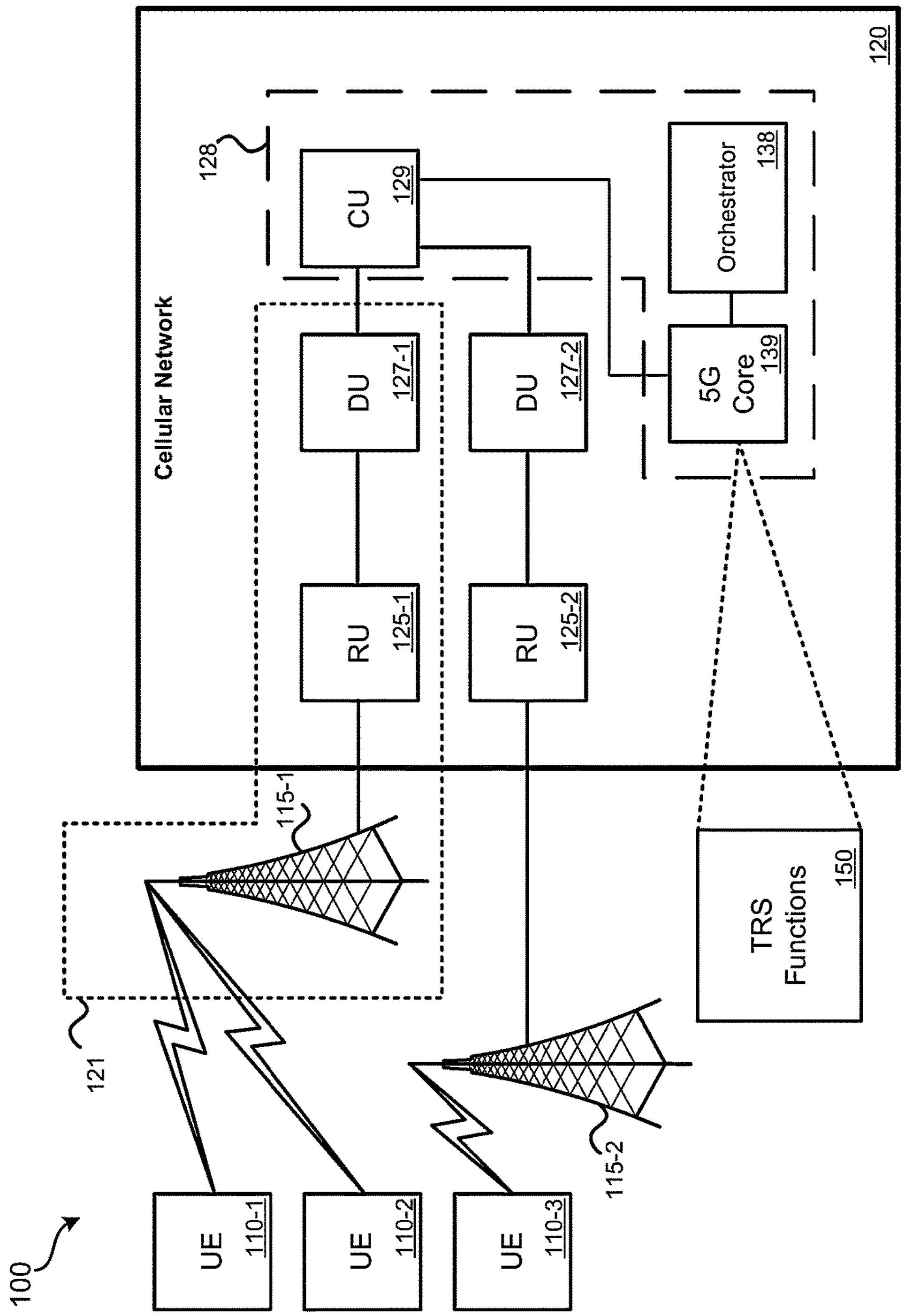
FIG. 1 illustrates an embodiment of a radio access network (RAN) and core of a cellular network.

Further detail regarding such embodiments is provided in relation to the Figures. FIG. 1 illustrates an embodiment of a radio access network (RAN) and core of a cellular network.

FIG. 1 illustrates an embodiment of a cellular network system 100 ("system 100"). System 100 can include a 5G New Radio (NR) cellular network; other types of cellular networks, such as 6G, 7G, etc. are also possible. System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and orchestrator 138. FIG. 1A represents a component level view. In an open radio access network (O-RAN), because components can be implemented as software in the cloud, except for components that need to receive and transmit RF, the functionality of the various components can be shifted among different servers, for which the hardware may be maintained by a separate cloud-service provider, to accommodate where the functionality of such components is needed. For example, components of 5G core 139 may be hosted using a cloud service provider.

UE 110 can represent various types of end-user devices, such as smartphones, cellular modems, cellular-enabled computerized devices, sensor devices, gaming devices, access points (APs), any computerized device capable of communicating via a cellular network, etc. UE can also represent any type of device that has incorporated a 5G interface, such as a 5G modem. UE 110 can include an electronic display that allows RTT and TTY to be viewed. Depending on the location of individual UEs, UE 110 may use RF to communicate with various base stations of cellular network 120. As illustrated, two base stations 115 (BS 115-1, 115-2) are illustrated. Real-world implementations of system 100 can include many (e.g., thousands) of base stations, RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, RUs, DUs, and CUs create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability. While embodiments herein are focused on TRS functions 150 being resident with 5G core 139, in other embodiments, TRS functions 150 can be placed closer to the edge, such as on an edge computing system in communication with CU 129 or DU 127-1, for example. As another example, in cloud-based implementations, TRS functions 150 can be hosted by a same cloud host system as DU 127-2.

Figure 3:
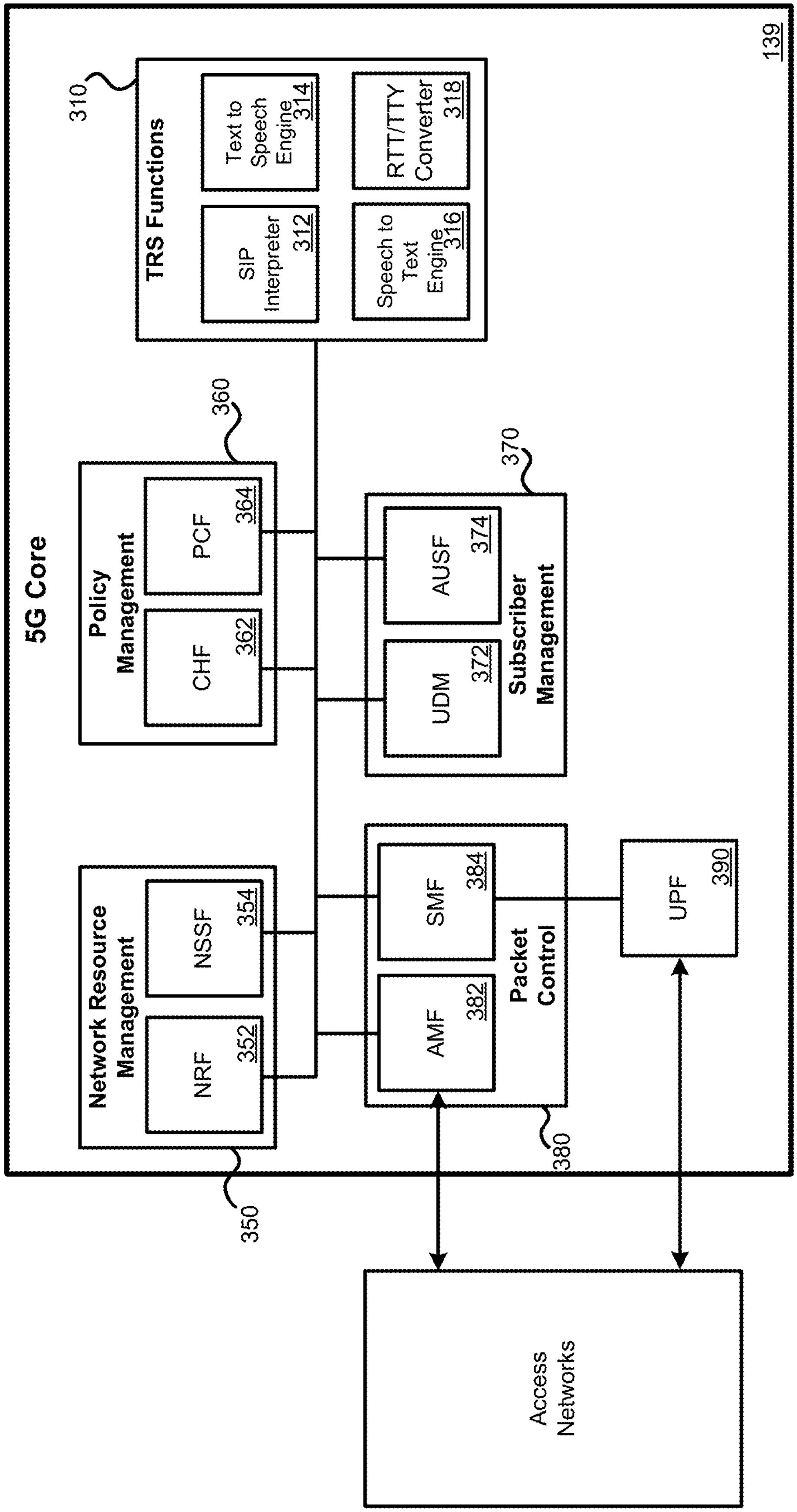
FIG. 3 illustrates an embodiment of the core of the cellular network with integrated TRS functions.

Further detail regarding 5G Core 139 and TRS functions 150 are provided in relation to FIG. 3. In the illustrated embodiment of FIG. 1, cellular network 120 comprise a native 5G core. Further, 5G core 139 can be a cloud-native 5G core, such that a cloud-computing system, for which the physical infrastructure can be maintained by a separate cloud-service provider, can provide the computing and storage capabilities. Such an arrangement allows for significant scalability of services, such as TRS functions 150.

In a possible O-RAN implementation, DUs 127, CU 129, 5G core 139, and/or orchestrator 138 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. In some embodiments, DUs 127 may be partially or fully added to cloud-based cellular network components 128. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical DU, CU, or 5G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU no longer exists, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 120. The underlying physical architecture of cellular network 120 can be shared among some number of network slices, such as tens, hundreds, or thousands of network slices. Communication bandwidth and computing resources of the underlying physical network can be reserved for individual network slices, thus allowing the individual network slices to reliably meet particular SLA levels, QoE parameters, and quality of service (QOS) parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., TRS services as detailed in relation to FIG. 3, gaming services, video services, voice services, location services, sensor reporting services, data services, etc.).

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

Figure 2:
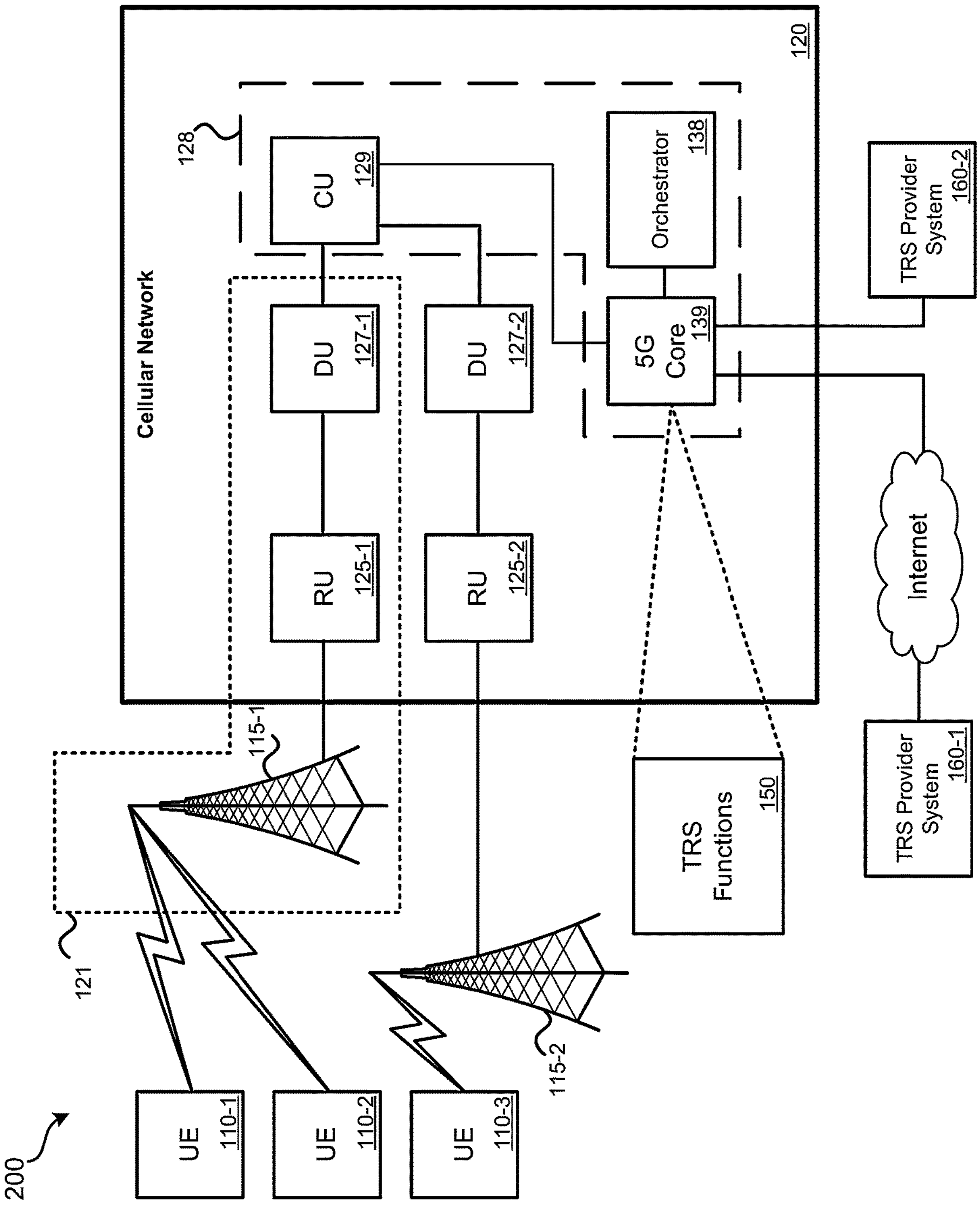
FIG. 2 illustrates an embodiment of the cellular network integrated with external TRS providers.

FIG. 2 illustrates an embodiment of a system 200 of the cellular network integrated with external TRS providers. Via TRS provider systems 160, live operators or a different speech-to-text or text-to-speech system may be engaged to perform TRS services. In addition or in alternate to TRS functions being hosted by 5G core 139, TRS services can be provided by one or more external providers. While TRS functions 150 can provide speech-to-text and text-to-speech services, some users may request that a live operator perform the transcription. In some embodiments, by entering a preference that defines the type and/or provider of transcription services on the user's UE, when a telephone call is performed, the correct TRS provider is engaged to perform transcription.

TRS provides may have a direct connection with cellular network 120 or via the Internet. TRS provider system 160-1 can use Internet 210 to communicate with cellular network 120, such as with 5G core 139. In other embodiments, another cellular network component, such as DU 127-1 or CU 129 can connect with an edge server (possibly via the Internet) that hosts TRS provider system 160-1. Additionally or alternatively, TRS provider system 160-2 may connect directly with cellular network 120, such as with 5G core 139. As previously discussed, all or portions of 5G core 139 can be hosted in the cloud. TRS provider systems 160 can also be hosted in the cloud using the same or a different cloud service provider.

FIG. 3 illustrates an embodiment of 5G core 139 of the cellular network with integrated TRS functions. 5G core 139, which can be physically distributed across data centers or located at a single data center can be understood as part of the cellular network's national data center (NDC), can perform various core functions of the cellular network. 5G core 339 can include: network resource management components 350; policy management components 360; subscriber management components 370; and packet control components 380. Individual components may communicate on a bus, thus allowing various components of 5G core 339 to communicate with each other directly. 5G core 339 is simplified to show some key components in addition to TRS functions 310. A real-world implementation of 5G core 339 can involve many more functions hosted by 5G core 339. Further, different functions may be present for different network slices. The illustrated embodiment of 5G core 339 represents a slice on which TRS functions 310 are available. On another slice, such as for UE that do not need TRS services, TRS functions 310 may not be available.

Several major core functions are illustrated as part of 5G core 339: Network resource management components 350 can include: Network Repository Function (NRF) 352 and Network Slice Selection Function (NSSF) 354. NRF 352 can allow 5G network functions (NFs) to register and discover each other via a standards-based application programming interface (API). NSSF 354 can be used by AMF 382 to assist with the selection of a network slice that will serve a particular UE. Policy management components 360 can include: Charging Function (CHF) 362 and Policy Control Function (PCF) 364. CHF 362 allows charging services to be offered to authorized network functions. Converged online and offline charging can be supported. PCF 364 allows for policy control functions and the related 5G signaling interfaces to be supported. Subscriber management components 370 can include: Unified Data Management (UDM) 372 and Authentication Server Function (AUSF) 374. UDM 372 can allow for generation of authentication vectors, user identification handling, NF registration management, and retrieval of UE individual subscription data for slice selection. AUSF 374 performs authentication with UE. Packet control components 380 can include: Access and Mobility Management Function (AMF) 382 and Session Management Function (SMF) 384. AMF 382 can receive connection- and session-related information from UE and is responsible for handling connection and mobility management tasks. SMF 384 is responsible for interacting with the decoupled data plane, creating updating and removing Protocol Data Unit (PDU) sessions, and managing session context with the User Plane Function (UPF).

User plane function (UPF) 390 can be responsible for packet routing and forwarding, packet inspection, QoS handling, and external PDU sessions for interconnecting with a Data Network (DN) 395 (e.g., the Internet) or various access networks 397. Access networks 397 can include the RAN of cellular network 320 of FIG. 3A.

TRS functions 310 can generally provide TRS services for UE that are mapped to the cellular network slice for which TRS functions 310 are available. In some embodiments, TRS functions 310 are available on all consumer slices and, therefore, a UE may not need to be reassigned to a different slice in order to access TRS functions 310. TRS functions can include: SIP interpreter 312; text to speech (TTS) engine 314; speech to text (STT) engine 316; and RTT/TTY converter 318 ("converter 318").

TRS functions 310 can be orchestrated by orchestrator 138. As a load increases on TRS functions 310, additional instances of one or more of the TRS functions can be instantiated at an appropriate data center (e.g., proximate to the need). Similarly, when the load decreases on TRS functions 310, instances of one or more of the TRS functions can be destroyed or otherwise taken offline.

In some embodiments, TRS services are provided based on information present within a SIP header of a telephone call. The telephone call may originate from a UE on cellular network 320 or may originate from some other telephone service provider. When a telephone call is to use TRS services, the SIP header may include one or more metadata fields that specify the TRS services to be provided. A SIP header can include fields such as: to; transport type; call-ID; contact; from; max-forwards; content-type; etc. For TRS, one or more additional fields can be added, such as indicated in Table 1.

TABLE 1

| Field | Purpose |
|---|---|
| TRS_Enabled | Whether or not TRS are needed for the telephone call. |
| TRS_Type | Indicates whether the originating party needs text services and/or the destination party needs text services. |
| TRS_Provider | Specifies whether TRS are provided by cellular network in automated fashion or by external provider. This field can also specify the identity of a specific external provider. |
| TRS_conversion | If both parties need TRS but are on disparate systems (e.g., RTT and TTY), conversion between the systems can be performed by enablement of this field. |

When a phone call is initiated, either within cellular network 320 or by some other telephone service provider, the created SIP header can include one or more of the TRS-related fields from Table 1. These TRS-related fields can be created based upon preferences defined by the user at the UE. For example, a user may have access on UE to an accessibility menu through which a user can define preferences for TRS, such as whether TRS should provide the user with text services or if TRS should be provided to the recipient of a call. If a call is initiated from a TTY machine, the initiating telephone network may populate the SIP header appropriately.

SIP interpreter 312 may analyze the SIP header of a call either initiated on cellular network 320 or received from another telephone service provider. Based on the SIP header, SIP interpreter 312 can initiate TRS as needed for the phone call.

TTS engine 314 may serve to convert text received from one party to the telephone call into speech that is output to the other party that is part of the phone call. Whether TTS engine 314 is activated can be based on SIP interpreter 312 analyzing the SIP header of the phone call.

Speech to Text (STT) engine 316 may serve to convert speech received from one party to the telephone call into text that is output to the other party that is part of the phone call. Whether STT engine 316 is activated can be based on SIP interpreter 312 analyzing the SIP header of the phone call.

Other network functions may be added to offer improved TRS for users. For example, a braille service may be added. Another option could be language translation services.

Cellular network 320 may by default use real time text (RTT) rather than teletypewriter (TTY) as the text output format. Converter 318 can be used to convert as needed between RTT and TTY. For example, RTT input by one participant of a phone call may need to be converted to TTY if one of the participants of a call is using a TTY machine. Further, the output of STT engine 316 may be converted to TTY by converter 318 in order to be placed in the correct format for the recipient of the text.

Figure 4:
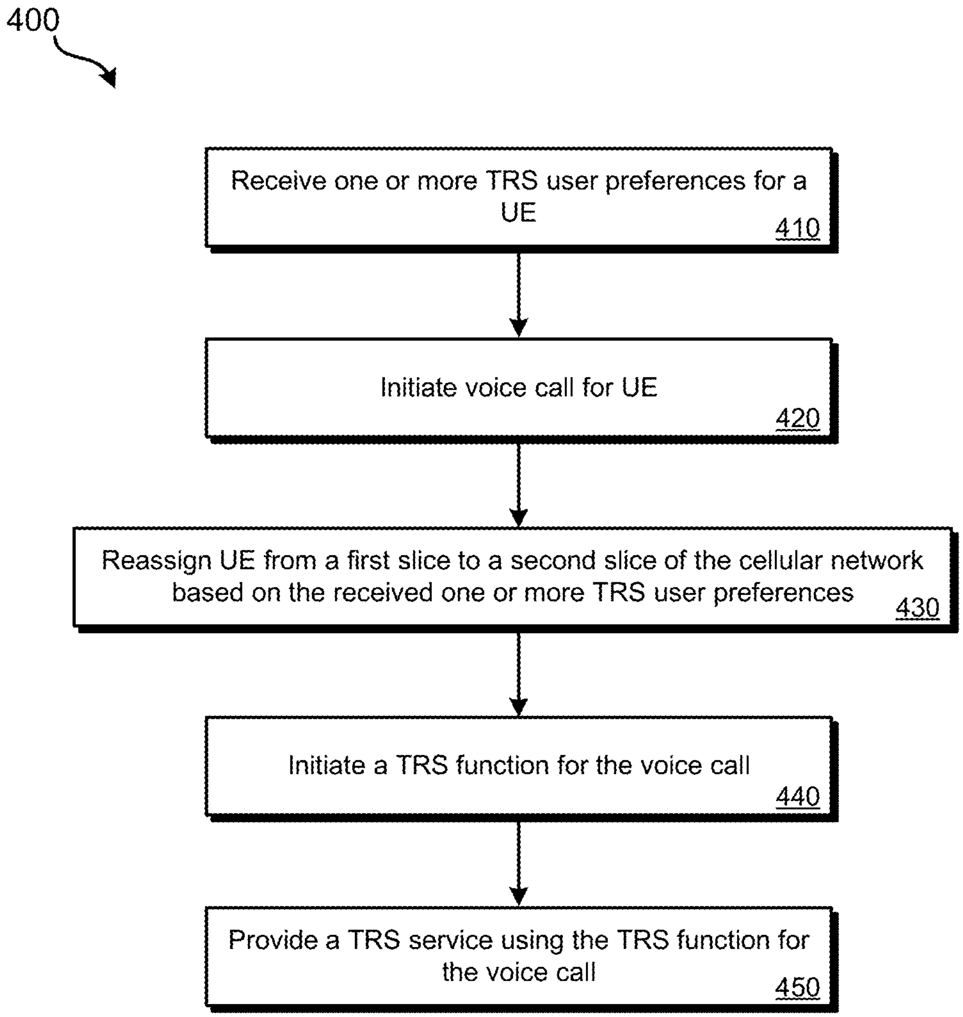
FIG. 4 illustrates an embodiment of a method for providing cellular network hosted telecommunications relay services (TRS).

Various methods may be performed using the system arrangements of FIGS. 3-3. FIG. 4 illustrates an embodiment of a method 400 for providing cellular network hosted telecommunications relay services (TRS). Method 400 can be performed by system 100 of FIG. 1 or system 200 of FIG. 2. Further, 5G core 339 of FIG. 3 can be used to perform method 400. While the core of FIG. 3 is specific to 5G, future generations of cellular network cores can be used instead.

At block 410, one or more TRS user preferences may be received. Block 410 can include a user inputting the one or more TRS user preferences to a UE. Block 410 can further involve the one or more TRS user preferences being received by cellular network, such as a 5G core, from the UE. In some embodiments, the one or more TRS user preferences are not received until a telephone call is initiated. The user preferences can allow a user to indicate whether TRS services are needed by the user of the UE and/or by the recipient of a phone call. The one or more TRS user preferences may also be used to define whether automated transcription services and speech services can be used or whether a live operator is desired to perform speech to text and text to speech translations. Since the user preference may only affect how the user of the UE experiences the phone call, it may be possible that the other party is unaware that the user is utilizing TRS. For example, if the user sets a preference that requests STT, the other party may be unaware that text is being presented to the user on the UE.

At block 420, a voice call may be initiated. The voice call may be initiated by the UE present on the cellular network of FIGS. 1 and/or 2. Alternatively, the voice call may be initiated using some other telephone operator system and the recipient of the voice call may use the cellular network.

At block 430, the UE may be reassigned for May 1 slice of the cellular network to a second slice of the cellular network. This reassignment may be based at least in part on the user having specified that TRS is requested via the one or more TRS user preferences. In some embodiments, reassignment from the first slice to the second slice may be performed in response to the one or more TRS user preferences having been received by the cellular network. In other embodiments, reassignment from the first slice to the second slice may be performed in response to the one or more TRS user preferences having been received by the cellular network and the voice call having been initiated. Therefore, in this embodiment, the second slice is only used by the UE for during an active call.

The first slice can represent a cellular network slice that does not provide TRS. The second slice can represent a cellular network slice that does provide TRS. Further, QoS and QoE parameters of the second slice may be set such that TRS is experienced by the user with a high level of reliability and low latency. Parameters that can be varied can include those related to forward error correction (FEC); prioritization, allocation of resources, and bandwidth. Particular parameters may be further optimized, such as if the user has RTT set to delay send, which is a user preference to send messages on complete rather than in real time, the parameters can be optimized for low bursts of data, and a higher bandwidth with frequency smoothing if the other side wants to use VoNR. Data in the SIP header can also be examined to see what type of device is being used (on either end or both ends). A smartphone performing a captioned video call could use less bandwidth than a computer with a sim card that uses the same video call service. As another example, if a person wants captioned video calls and indicates no audio is to be output, then the bandwidth typically devoted to audio could be reallocated for the video stream. The parameters configured for the slice may define a minimum level of service. If the slice is not being heavily utilized, the performance may be significantly higher than the minimum parameters specified.

In other embodiments, the UE does not need to be assigned to a different slice for TRS. Rather, the same slice that is used for non-TRS phone calls can be used, but TRS can be enabled for a phone call based on the specified one or more user preferences.

At block 440, one or more TRS functions may be initiated for the voice call. As detailed in relation to FIG. 3, the TRS functions can include text to speech, speech to text, and conversion between RTT and TTY. The TRS functions that are initiated can be based at least in part on the one or more TRS preferences specified at block 410.

At block 450, the TRS service can be provided or executed for the duration of the call using the one or more initiated TRS functions for the voice call. If the one or more TRS user preferences specified that an external TRS provider is to provide TRS services, the voice call may be routed through an external TRS provider system, such as TRS provider system 160-1 or TRS provider system 160-2. The user preferences may specify a particular TRS provider with which the user desires to interact. Alternatively, the cellular network may select a particular TRS provider that has available bandwidth and/or satisfies parameters of the voice call (e.g., TTY compatibility). In such embodiments, 5G core 139 may route the call to the appropriate TRS provider system.

Figure 5:
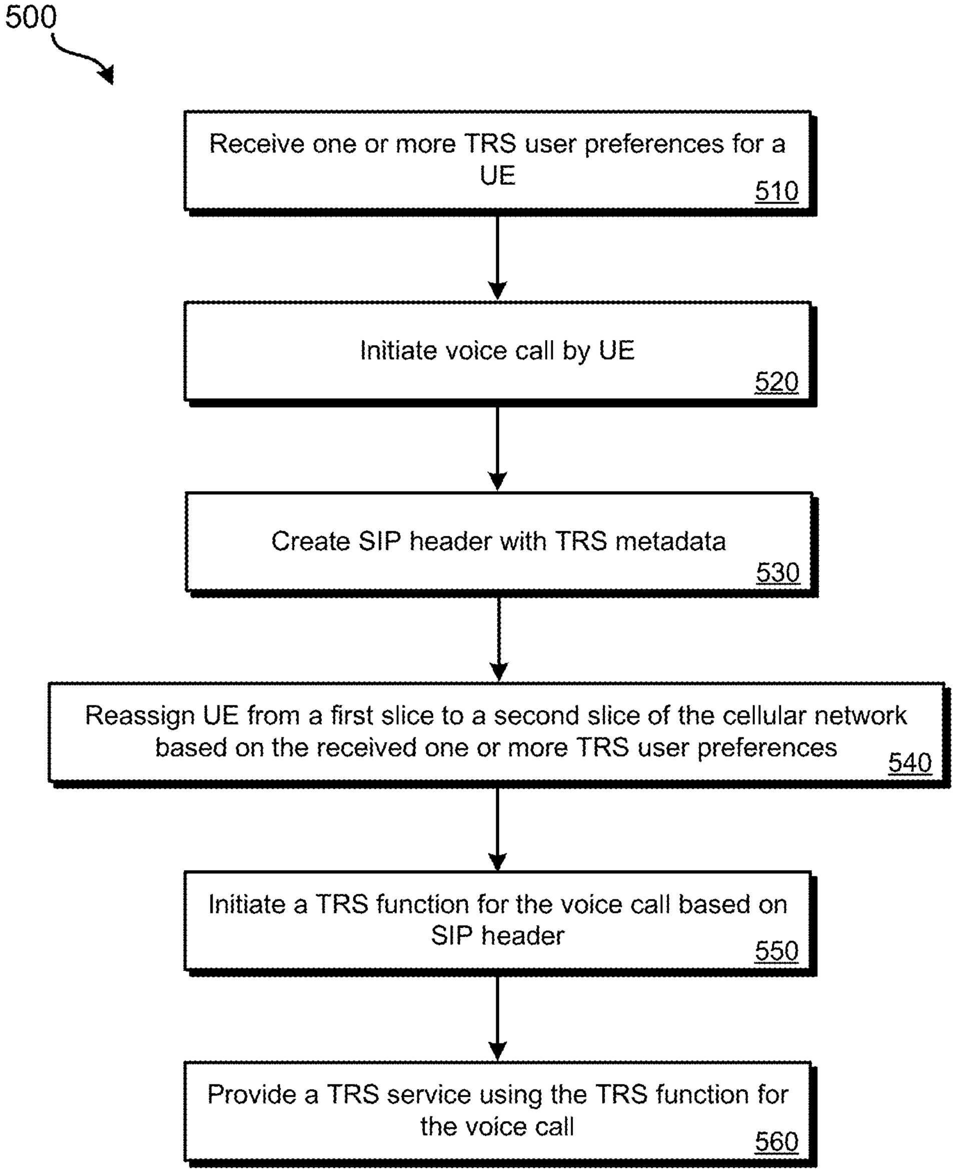
FIG. 5 illustrates another embodiment of a method for providing cellular network hosted telecommunications relay services (TRS).

FIG. 5 illustrates an embodiment of a method 500 for providing cellular network hosted telecommunications relay services (TRS). Method 500 can be performed by system 100 of FIG. 1 or system 200 of FIG. 2. Further, 5G core 339 of FIG. 3 can be used to perform method 500. While the core of FIG. 3 is specific to 5G, future generations of cellular network cores can be used instead.

At block 510, one or more TRS user preferences may be received. Block 510 can include a user inputting the one or more TRS user preferences to a UE. Block 510 can further involve the one or more TRS user preferences being received by cellular network, such as a 5G core, from the UE. In some embodiments, the one or more TRS user preferences are not received until a telephone call is initiated. The user preferences can allow a user to indicate whether TRS services are needed by the user of the UE and/or by the recipient of a phone call. The one or more TRS user preferences may also be used to define whether automated transcription services and speech services can be used or whether a live operator is desired to perform speech to text and text to speech translations.

Of note, in some embodiments of method 500, the request for TRS originates from the user either placing or receiving the telephone call from outside of cellular network 120. Therefore, in such embodiments, no preferences may be received regarding TRS from the UE on the cellular network that is participating in the telephone call.

At block 520, a telephone voice call may be initiated. The voice call may be initiated by the UE present on the cellular network of FIGS. 1 and/or 2. Alternatively, the voice call may be initiated using some other telephone operator system and the recipient of the voice call may use the cellular network.

At block 530, if the call is initiated on the cellular network, the UE and/or the cellular network may create a session using SIP, wherein the SIP header can include fields that specify what TRS is required. Such fields may include one or more of those detailed in relation to Table 1. For example, the SIP header can indicate whether the party initiating the call desires speech from the recipient to be translated to text (e.g., RTT). Alternatively, if the call is initiated by an external telephonic network, the cellular network may receive a SIP invite having a SIP header that specifies the TRS requested to be performed by the cellular network. For example, a conversion between RTT and TTY may be needed to be performed by the cellular network.

At block 540, the UE may be reassigned from a first slice of the cellular network to a second slice of the cellular network. This reassignment may be based at least in part on the user having specified that TRS is requested via the one or more TRS user preferences of block 510, the contents of the SIP header, or both. For example, even if no TRS user preferences have been specified, the SIP header from a call initiated by the other party to the call may indicate that TRS services are required. In some embodiments, reassignment from the first slice to the second slice may be performed in response to the one or more TRS user preferences having been received by the cellular network. In other embodiments, reassignment from the first slice to the second slice may be performed in response to the one or more TRS user preferences having been received by the cellular network and the voice call having been initiated. Therefore, in this embodiment, the second slice is only used by the UE for during an active call.

The first slice can represent a cellular network slice that does not provide TRS. The second slice can represent a cellular network slice that does provide TRS. Further, QoS and QoE parameters of the second slice may be set such that TRS is experienced by the parties to the telephone call with a high level of reliability and low latency. In other embodiments, the UE does not need to be assigned to a different slice for TRS. Rather, the same slice that is used for non-TRS phone calls can be used, but TRS can be enabled for a phone call based on the specified one or more user preferences.

At block 550, one or more TRS functions may be initiated for the voice call based on the content of the SIP header. As detailed in relation to FIG. 3, the TRS functions can include text to speech, speech to text, and conversion between RTT and TTY. In some embodiments, the content of the SIP header is created based at least in part on the one or more TRS preferences specified at block 510, with the SIP header being used, in turn, to select the one or more TRS functions to activate for a call. Since the SIP header is used to determine the TRS functions that are activated, a call originating on a different telephone network that includes TRS metadata in the SIP header can be used to trigger TRS functions hosted or coordinated by the cellular network.

At block 560, the TRS service can be provided or executed for the duration of the call using the one or more TRS functions initiated based on the SIP header for the voice call. If the SIP header specifies that an external TRS provider is to provide TRS services, the voice call may be routed to an external TRS provider system, such as TRS provider system 160-1 or TRS provider system 160-2. The user preferences may specify a particular TRS provider with which the user desires to interact. Alternatively, the cellular network may select a particular TRS provider that has available bandwidth and/or satisfies parameters of the voice call (e.g., TTY compatibility). In such embodiments, 5G core 139 may route the call to the appropriate TRS provider system.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for providing cellular network hosted telecommunications relay services (TRS), the method comprising:

reassigning, by a cellular network, a piece of user equipment (UE) from a first slice of the cellular network to a second slice of the cellular network based on a TRS preference, wherein:

the second slice provides access to a TRS function;

initiating, by the cellular network, the TRS function hosted by the cellular network for a voice call involving the UE on the second slice; and providing, by the cellular network, the TRS function for the voice call involving the UE.

2. The method of claim 1, further comprising:

receiving, by the cellular network, the TRS preference for the UE from a user.

3. The method of claim 1, wherein the TRS function is initiated in response to the voice call being initiated.

4. The method of claim 1, wherein the TRS function is initiated in response to the voice call being assigned to the second slice.

5. The method of claim 1, wherein the TRS function is to convert text input to the UE during the voice call to speech.

6. The method of claim 1, wherein the TRS function is to convert voice input to the UE during the voice call to text.

7. The method of claim 6, wherein the text that is output is selected from the group consisting of: real time text (RTT); teletypewriter (TTY) text; and a captioned video call.

8. The method of claim 1, wherein the first slice does not provide access to the TRS function.

9. The method of claim 1, wherein the voice call is initiated by the UE and initiation of the voice call comprises a session initiation protocol (SIP) header being created that specifies the TRS preference.

10. The method of claim 9, wherein the cellular network initiates the TRS based on the SIP header.

11. A cellular network with integrated telecommunications relay service (TRS), the cellular network comprising:

a plurality of radio units (RUS);

a plurality of distributed units (DUs) connected with the plurality of RUs;

a cellular network core in communication with the plurality of DUs, wherein the cellular network core comprises a TRS function, the cellular network configured to:

reassign a piece of user equipment (UE) from a first slice of the cellular network to a second slice of the cellular network based on a TRS preference, wherein:

the second slice provides access to the TRS function;

initiate the TRS function hosted by the cellular network for a voice call involving the UE on the second slice; and provide the TRS function for the voice call involving the UE.

12. The cellular network of claim 11, wherein the cellular network is further configured to receive the TRS preference for the UE from a user.

13. The cellular network of claim 11, wherein the TRS function is initiated in response to the voice call being initiated.

14. The cellular network of claim 11, wherein the TRS function is initiated in response to the voice call being assigned to the second slice.

15. The cellular network of claim 11, wherein the TRS function is to convert text input to the UE during the voice call to speech.

16. The cellular network of claim 11, wherein the TRS function is to convert voice input to the UE during the voice call to text.

17. The cellular network of claim 16, wherein the text that is output is selected from the group consisting of: real time text (RTT); teletypewriter (TTY) text; and a captioned video call.

18. The cellular network of claim 11, wherein the first slice does not provide access to the TRS function.

19. The cellular network of claim 11, wherein the voice call is initiated by the UE and initiation of the voice call comprises a session initiation protocol (SIP) header being created that specifies the TRS preference.

20. A non-transitory processor-readable medium, comprising processor-readable instructions configured to cause one or more processors to:

reassign a piece of user equipment (UE) from a first slice of a cellular network to a second slice of the cellular network based on a TRS preference, wherein:

the second slice provides access to a TRS function;

initiate the TRS function hosted by the cellular network for a voice call involving the UE on the second slice; and provide the TRS function for the voice call involving the UE.

* * * * *